United States Patent Office 2,849,418
Patented Aug. 26, 1958

2,849,418
THERMOSETTING EPOXIDE POLYMER MIXTURES, METHOD OF MAKING SAME AND COATINGS CONTAINING SAME

James C. Fang, Sharon Hill, Pa., assignor to E. I. du Pont de Nemours and Company, Wilmington, Del., a corporation of Delaware No Drawing. Application November 10, 1953
Serial No. 391,380

24 Claims. (Cl. 260—45.5)

This invention relates to thermosetting polymeric compositions and particularly to thermosetting compositions comprising phosphated epoxide polymers.

The term "phosphated epoxide polymer," as used herein, means a phosphate ester of an epoxide-containing addition-type polymer prepared by the polymerization of one or more polymerizable ethylenically unsaturated monomers. An example is the product of a reaction between phosphoric acid and an epoxide-containing polymer, such as a copolymer of styrene and glycidyl methacrylate, which is believed to occur in accordance with the following equation:

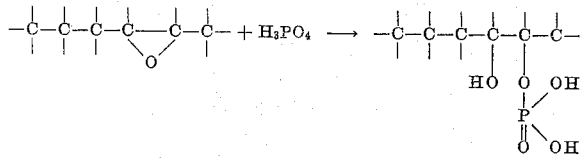

The term "epoxide-containing compound free of phosphate groups" means a monomeric or polymeric compound containing the epoxide group,

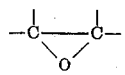

but not the phosphate ester group,

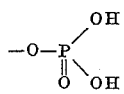

Examples are ethylene oxide and a copolymer of styrene and glycidyl methacrylate.

The general object of this invention is to provide thermosetting compositions comprising phosphated epoxide polymers. The specific objects are to provide thermosetting heat-convertible mixtures of phosphated epoxide polymers and epoxide-containing compounds free of phosphate groups, liquid coating compositions comprising such mixtures, liquid coating compositions comprising soluble thermosetting heat-convertible reaction products of such mixtures, thermoset heat-converted products of such mixtures, and articles having surface coatings of such thermoset heat-converted products.

These objects are accomplished by mixing a phosphated epoxide polymer with an epoxide-containing compound free of phosphate groups, whereby a thermosetting heat-convertible polymeric composition is produced.

The liquid coating compositions of this invention are prepared by mixing the above mentioned ingredients in the presence of a volatile liquid medium, a convenient method being to start with solutions of either or both classes of ingredients. Liquid coating compositions are also prepared by heating a solution of a mixture of the above mentioned ingredients under controlled conditions whereby a solution of a heat-convertible reaction product of said ingredients is produced.

The thermoset heat-converted products are prepared by subjecting the mixtures, or coatings deposited from solutions of such mixtures or from solutions of heat-convertible reaction products of such mixtures, to an elevated temperature for a period sufficient to cause the above mentioned materials to form insoluble solid products, i. e. products that are insoluble in, or not deleteriously affected by, solvents which are capable of dissolving the starting mixture.

It has been found that the above defined products of this invention have improved thermosetting properties in comparison with compositions containing similar phosphated epoxide polymers but no epoxide-containing compound free of phosphate groups. The improved thermosetting properties may be expressed as improved resistance to the dissolving or softening action of solvent after the products being compared have been cured at the same temperature for the same period of time. Alternatively, the improved thermosetting properties may be expressed as substantially the same degree of resistance to the action of solvent after the products of this invention have been cured at a lower temperature and/or for a shorter period than the composition containing a phosphated epoxide polymer but no epoxide-containing compound free of phosphate groups.

The degree to which a composition is thermoset is important in industry because properly thermoset or heat-converted compositions have desirable properties such as hardness, toughness, chemical resistance or wear resistance. The conditions required for proper thermosetting are important because high temperatures and long curing periods make a process or product cost more than lower temperatures and shorter curing periods. The products of this invention provide better hardness, toughness, chemical resistance, wear resistance or other desirable properties for a given set of curing conditions or, alternatively, they provide equally acceptable properties under less costly curing conditions.

The following specific examples illustrate this invention but are not intended to be a limitation thereof. Unless otherwise indicated, the parts and percentages are given by weight.

EXAMPLE 1

*Preparation of epoxide polymer A*

A copolymer of styrene and glycidyl methacrylate was prepared by heating the following charge under reflux conditions at 130°–135° C. for 6 hours:

| | Parts by weight |
|---|---|
| Distilled styrene | 1,275 |
| Glycidyl methacrylate | 225 |
| Ditertiarybutyl peroxide | 30 |
| Xylene | 1,500 |
| | 3,030 |

The resulting product was an approximately 50% solution of a copolymer containing about 85% polymerized styrene and about 15% polymerized glycidyl methacrylate.

*Preparation of phosphated epoxide polymers B and C*

Two phosphated epoxide polymers were prepared from the above described copolymer by stirring the following separate charges for 1 hour at room temperature and then heating for 1 hour at 60°–70° C.

| | Parts by weight | |
|---|---|---|
| | B | C |
| Styrene-glycidyl methacrylate copolymer solution A | 50.00 | 100.00 |
| Methyl isobutyl ketone | 33.00 | 66.00 |
| Aqueous 85.4% orthophosphoric acid | 3.03 | 3.03 |
| | 86.03 | 169.03 |

The clear reaction products were cooled to room temperature.

In charge B the phosphoric acid was present in the proportion of 1 mol of $H_3PO_4$ per mol of epoxide oxygen (the oxygen of the epoxide ring) in the copolymer. In charge C the proportion was 0.5 mol of $H_3PO_4$ per mol of epoxide oxygen.

*Preparation of thermosetting composition D*

A thermosetting composition of this invention comprising a mixture of a phosphated epoxide polymer and an epoxide-containing compound free of phosphate groups was prepared by mixing the following ingredients to form a clear solution.

| | Parts by weight |
|---|---|
| Phosphated epoxide polymer solution B | 86.03 |
| Epoxide polymer solution A | 50.00 |
| Methyl isobutyl ketone | 33.00 |
| | 169.03 |

The phosphated epoxide polymer C was not further modified.

It will be seen that the compositions C and D contain epoxide oxygen and phosphate ester groups in substantially the same proportions but that D, which illustrates this invention, is a solution of a mixture of a phosphated epoxide polymer and an epoxide-containing compound free of phosphate groups, whereas C is a solution of a chemical compound, the composition of which is analogous to the above mentioned mixture.

Thin coatings of C and D were applied separately to a glass panel by means of a doctor blade. The panel was heated in an oven at 250° F. for 30 minutes. The resulting films of C and D were clear, hard and adherent.

The degree of curing, thermosetting or heat-conversion of each film was determined by placing a few drops of methyl ethyl ketone on each film, covering the spot with a watch glass and letting it stand for 5 minutes. Then the spot was dried with a blotter and the condition of each film was observed. The film of C had developed a system of interlocking minute cracks, commonly defined as crazing. The film of D was unaffected.

These results show that a mixture as described in this invention possesses markedly better thermosetting properties than an analogous chemical compound. Further experience has shown that in order to increase the degree of curing of the latter to a level substantially equal to the product of this invention, prolonged heating at the same temperature, 250° F., or heating for the same period, 30 minutes, at a higher temperature, e. g. 300° F., is required.

The product of this invention which is illustrated in this example is useful as a clear coating composition or as a film-forming ingredient for use with other ingredients in clear or pigmented coating compositions.

EXAMPLE 2

*Preparation of epoxide polymer E*

A copolymer of styrene and glycidyl methacrylate was prepared by heating the following charge under reflux conditions at 115°–125° C. for 8 hours:

| | Parts by weight |
|---|---|
| Distilled styrene | 850 |
| Glycidyl methacrylate | 150 |
| Ditertiarybutyl peroxide | 20 |
| Methyl isobutyl ketone | 1,000 |
| | 2,020 |

The resulting product was an approximately 50% solution of a copolymer containing about 85% polymerized styrene and about 15% polymerized glycidyl methacrylate.

*Preparation of phosphated epoxide polymer F*

A phosphated epoxide polymer was prepared from the above described copolymer by stirring the following charge for 1 hour at room temperature and heating it for 1 hour under reflux conditions at 110°–115° C.

| | Parts by weight |
|---|---|
| Styrene-glycidyl methacrylate copolymer solution E | 1,771.0 |
| Methyl isobutyl ketone | 1,184.0 |
| Aqueous 85.4% orthophosphoric acid | 107.5 |
| | 3,062.5 |

The phosphoric acid was present in the proportion of 1 mol of $H_3PO_4$ per mol of epoxide oxygen in the copolymer.

A clear solution resulted from the above described process.

In order to incorporate hydrocarbon solvent in this composition without undesirable dilution, 1685 parts of methyl isobutyl ketone were removed from it by vacuum distillation at about 100° C. and were replaced with 1000 parts of xylene. The resulting product was a clear 38.5% solution of phosphated epoxide polymer.

*Preparation of thermosetting composition G*

A thermosetting composition of this invention comprising a solution of a soluble reaction product of a mixture of a phosphated epoxide polymer and an epoxide-containing compound free of phosphate groups was prepared by heating the following ingredients at 60°–70° C. for 1 hour:

| | Parts by weight |
|---|---|
| Phosphated epoxide polymer solution F | 267.5 |
| Epoxide polymer solution E | 96.0 |
| Toluene | 136.5 |
| | 500.0 |

The resulting product was a clear 30% solution. It was useful as a coating composition and produced an insoluble, clear, hard, adherent film when applied to a steel panel and baked for 30 minutes at 250° F.

EXAMPLE 3

A pigmented coating composition of this invention was prepared by grinding the following ingredients in conventional paint grinding apparatus until a smooth dispersion was produced.

| | Parts by weight |
|---|---|
| Solution G of Example 2 | 333 |
| Titanium dioxide pigment | 50 |
| Butyl alcohol | 25 |
| Toluene | 40 |
| Ethylene glycol monoethyl ether acetate | 20 |
| | 468 |

The resulting composition was sprayed on a bonderite-coated steel panel and the panel was baked for 30 minutes at 250° F. The resulting white coating was insoluble, glossy, hard and adherent, which properties make it useful for refrigerators, washing machines and the like.

EXAMPLE 4

*Preparation of epoxide polymer H*

A copolymer of styrene and glycidyl methacrylate was prepared by heating the following charge under reflux conditions at 135°–137° C. for 6 hours.

| | Parts by weight |
|---|---|
| Distilled styrene | 400 |
| Glycidyl methacrylate | 100 |
| Ditertiarybutyl peroxide | 10 |
| Xylene | 500 |
| | 1,010 |

The resulting product was an approximately 50% solution of a copolymer containing about 80% polymerized styrene and about 20% polymerized glycidyl methacrylate.

*Preparation of phosphated epoxide polymer J*

A phosphated epoxide polymer was prepared by stirring the following charge for 1 hour at room temperature and then heating it for 1 hour at 60°–70° C.

| | Parts by weight |
|---|---|
| Styrene-glycidyl methacrylate copolymer solution H | 713.5 |
| Methyl isobutyl ketone | 481.5 |
| Aqueous 85.4% orthophosphoric acid | 49.5 |
| | 1,244.5 |

The phosphoric acid was present in the proportion of 0.85 mol of $H_3PO_4$ per mol of epoxide oxygen in the copolymer.

A clear solution resulted from the above described process. The solution was concentrated to about 50% solids by removing 350 parts of volatile material by vacuum distillation at about 100° C.

*Preparation of thermosetting composition K*

A thermosetting composition of this invention comprising a mixture of a phosphated epoxide polymer and an epoxide-containing compound free of phosphate groups was prepared by mixing the following ingredients to form a clear solution:

| | Parts by weight |
|---|---|
| Phosphated epoxide polymer solution J | 20 |
| Epoxide polymer solution H | 10 |
| Methyl isobutyl ketone | 20 |
| | 50 |

The resulting product was a clear solution. It was useful as a coating composition and formed a clear, hard, adherent film when applied to a steel panel and baked for 30 minutes at 250° F. The film was also resistant to water and dilute alkali.

EXAMPLE 5

*Preparation of epoxide polymer L*

A copolymer of styrene and allyl glycidyl ether was prepared by placing 2400 parts of allyl glycidyl ether in a flask, heating it to 146° C. under reflux conditions and then beginning the drop-wise addition of the following mixture:

| | Parts by weight |
|---|---|
| Commercial styrene | 4,000 |
| Allyl glycidyl ether | 800 |
| Alpha, alpha' azodiisobutyronitrile | 120 |
| | 4,920 |

The drop-wise addition was completed in 6 hours, during which the temperature was maintained at 142°–146° C. under reflux conditions. Heating in this temperature range was then continued for an additional 2 hours.

Unreacted monomer was removed by distilling off 1818 parts under vacuum at about 100° C. Then 500 parts of Solvesso 100, a 95% aromatic hydrocarbon having a boiling range of about 150°–185° C. supplied by Esso Standard Oil Company, were added and distilled off under vacuum. The latter step was repeated with a second addition of 500 parts of Solvesso 100. Finally the charge was cooled to room temperature and 4000 parts of methyl ethyl ketone were added.

The resulting product was a 53.4% solution of a copolymer containing 86.2% of polymerized styrene and 13.8% of polymerized allyl glycidyl ether.

*Preparation of phosphated epoxide polymer M*

A phosphated epoxide polymer was prepared from the above described copolymer by stirring the following charge for 1 hour at room temperature and heating it for 1 hour at 60°–70° C.

| | Parts by weight |
|---|---|
| Styrene-allyl glycidyl ether copolymer solution L | 2,090 |
| Methyl ethyl ketone | 1,630 |
| Aqueous 85.4% orthophosphoric acid | 155 |
| | 3,875 |

The phosphoric acid was present in the proportion of 1 mol of $H_3PO_4$ per mol of epoxide oxygen in the copolymer.

The above described process produced a clear 36.4% solution, the solid portion of which had an acid number of 188.

*Preparation of thermosetting composition N*

A thermosetting composition of this invention was prepared by separately cooling 275 parts of the phosphated epoxide polymer solution M and 5.8 parts of propylene oxide to about 5° C., mixing the two and stirring them at this temperature for 2 hours. Then the solution was raised to room temperature. The fact that the solid portion of the resulting solution had an acid number of 132 indicated that a reaction had occurred.

The resulting solution was useful as a coating composition. It produced an insoluble, clear, hard, adherent film when applied to a steel panel and baked for 30 minutes at 250° F.

EXAMPLE 6

*Preparation of epoxide polymer O*

A copolymer of methyl methacrylate and glycidyl methacrylate was prepared by placing 500 parts of isopropyl benzene and 1000 parts of methyl isobutyl ketone in a flask, heating it to 120° C. under reflux conditions and then beginning the drop-wise addition of the following mixture:

| | Parts by weight |
|---|---|
| Distilled methyl methacrylate | 1,000.0 |
| Glycidyl methacrylate | 142.0 |
| Methyl isobutyl ketone | 500.0 |
| Cumene hydroperoxide | 32.6 |
| | 1,674.6 |

The drop-wise addition was completed in 3 hours, during which the temperature was maintained at about 120° C. under reflux conditions. Heating at this temperature was then continued for an additional 2 hours. Finally the charge was cooled to room temperature.

The resulting product was an approximately 40% solution of a copolymer containing about 87.5% of polymerized methyl methacrylate and about 12.5% of polymerized glycidyl methacrylate.

*Preparation of phosphated epoxide polymer P*

A phosphated epoxide polymer was prepared by stirring the following charge for 1 hour at room temperature and heating it to 60°–70° C. for 1 hour:

| | Parts by weight |
|---|---|
| Methyl methacrylate-glycidyl methacrylate copolymer solution O | 635 |
| Aqueous 85.4% orthophosphoric acid | 23 |
| Methyl isobutyl ketone | 137 |
| | 795 |

The phosphoric acid was present in the proportion of 1 mol of $H_3PO_4$ per mol of epoxide oxygen in the copolymer.

A clear solution resulted from the above described process.

Preparation of thermosetting composition Q

A thermosetting composition of this invention comprising a mixture of a phosphated epoxide polymer and an epoxide-containing compound free of phosphate groups was prepared by mixing the following ingredients to form a clear solution:

| | Parts by weight |
|---|---|
| Phosphated epoxide polymer solution P | 63.3 |
| Epoxide polymer solution O | 25.3 |
| Toluene | 12.0 |
| | 100.6 |

The resulting product was useful as a coating composition and produced an insoluble, clear, hard, adherent film when applied to a primed steel panel and baked for 30 minutes at 250° F.

The preparation of the phosphated epoxide polymers employed in this invention forms no part thereof, and such preparations are described in examples only for the purpose of completeness. The most useful phosphated epoxide polymers are prepared by employing 0.25–1.50 mols of $H_3PO_4$ per mol of epoxide oxygen in the polymer, although the even further restricted range of 0.5–1.0 mol of $H_3PO_4$ is preferred. Likewise, the order of addition and the reaction conditions may be varied as desired. While orthophosphoric acid is the preferred phosphating agent; other acids, such as metaphosphoric and pyrophosphoric acids, may be used. Likewise, partially esterfied phorphorus acids, such as methyl acid phosphate and butyl acid phosphate, may be used.

The above described illustrative examples disclose a variety of phosphated epoxide polymers as ingredients of the new thermosetting compositions of this invention. Other phosphated epoxide polymers may be substituted for the particular phosphated polymers in the examples, preferably on the basis of equivalent phosphate content, or may be used in other compositions within the scope of this invention. The suitable phosphated epoxide polymers are defined as the phosphate ester derivatives of epoxide-containing addition polymers, i. e., polymers of polymerizable ethylenically unsaturated epoxide-containing monomers or copolymers thereof with one or more other polymerizable ethylenically unsaturated monomers, such as, for example, the copolymers disclosed in the examples, copolymers of vinyl acetate and allyl glycidyl ether, copolymers of vinyl chloride and allyl glycidyl ether, copolymers of methyl methacrylate and allyl glycidyl ether, homopolymers such as polyglycidyl methacrylate, and polymers containing more than two polymerized materials such as an interpolymer of styrene, ethyl acrylate and glycidyl methacrylate. Polymers containing a plurality of phosphate groups are preferred.

The examples disclose a variety of epoxide-containing compounds free of phosphate groups as ingredients of the new thermosetting compositions of this invention. Other epoxide-containing compounds may be substituted for the particular epoxide-containing compounds in the examples, preferably on the basis of an equivalent epoxide content. While the preferred epoxide compound for use with a given phosphated epoxide polymer is the epoxide polymer from which the phosphated epoxide polymer is derived, other combinations can be used. Other suitable epoxide-containing compounds free of phosphate groups which may be substituted in the examples or used in other compositions of this invention include monomeric epoxides such as ethylene oxide, butylene oxide, styrene oxide, butadiene oxide, vinyl cyclohexene oxide, epichlorohydrin, glycidol, diglycidyl ether, ethyl glycidyl ether, allyl glycidyl ether, glycidyl methacrylate, glycidic acid, glycidic acid esters, and epoxidized fatty oils. Still other suitable epoxide-containing compounds free of phosphate groups include epoxide-containing addition polymers, i. e., polymers of polymerizable ethylenically unsaturated epoxide-containing monomers or copolymers thereof with one or more other polymerizable ethylenically unsaturated monomers, such as, for example, copolymers of vinyl acetate and allyl glycidyl ether, copolymers of vinyl chloride and allyl glycidyl ether, copolymers of methyl methacrylate and allyl glycidyl ether, homopolymers such as polyglycidyl methacrylate, and polymers containing more than two polymerized materials such as an interpolymer of styrene, ethyl acrylate and glycidyl methacrylate. In the case of relatively volatile epoxide compounds, such as ethylene oxide, the products of this invention may be made by bubbling the epoxide compound in the form of a gas through the composition or by mixing the cooled ingredients at a temperature substantially below the boiling point of the volatile ingredient.

Because the phosphate ester content of the phosphated epoxide polymer and the epoxide content of the epoxide-containing compound may vary over wide ranges, it is not convenient to define the proportions of the essential ingredients in parts by weight alone. The proportions are more conveniently defined in terms of the respective phosphate and epoxide contents. The most useful compositions of this invention contain phosphated epoxide polymer and epoxide-containing compound free of phosphate groups in such proportions that there is present 0.10–1.5 mols of epoxide oxygen in the epoxide-containing compound for each mol of phosphate ester, calculated as $—H_2PO_4$, in the phosphated epoxide polymer. The preferred proportions are in the even further restricted range of 0.50–1.0 mol of epoxide oxygen for each mol of phosphate ester.

The particular solvents and the particular pigment employed in the examples are merely illustrative and may be replaced wholly or partially by a wide variety of such materials which are commonly employed in the polymer and coating arts.

Likewise, the methods of application, the baking conditions, and the nature of the articles coated in the examples are merely illustrative and may be altered to suit a particular end use without departing from the spirit of this invention. Other methods of application include, for instance, brushing and dipping. Other baking conditions include, for instance, heating at 200°–400° F. for periods varying between 10 minutes and 3 hours. Other suitable substrates include, for instance, aluminum, copper and other non-ferrous metals, glass or asbestos fabrics, ceramics, and similar heat-resistant materials.

While the examples describe compositions comprising, as the only film-forming constituent, a phosphated epoxide polymer in combination with an epoxide-containing compound, other compatible film-forming materials may be incorporated in the compositions, as well as other well known ingredients for polymeric compositions. Such additives include alkyd resins, phenolic resins, polyvinyl acetal resins, plasticizers, inhibitors, catalysts and surface active agents.

Although the examples describe only compositions in the form of solutions, the invention also includes similar products in an undissolved form. Adhesives, impregnants, and molding, casting and extruding compositions may be made by separating the ingredients from their solvents and mixing the thus obtained products, or by separating the solid portion of dissolved mixtures or dissolved reaction products from their solvents.

It is apparent that many widely different embodiments of this invention may be made without departing from the spirit and scope thereof; and, therefore, it is not intended to be limited except as indicated in the appended claims.

I claim:

1. As a new composition of matter, a thermo-setting mixture comprising a phosphated epoxide polymer and an epoxide-containing compound free of phosphate groups in such proportions that there are present 0.10–1.5 mols of epoxide oxygen in the epoxide-containing compound for each mol of phosphate ester, calculated as $H_2PO_4$, in the phosphated epoxide polymer, said phosphated epoxide polymer being a phosphate ester reaction product of a preformed epoxide-containing addition-type polymer prepared by polymerizing at least one polymerizable ethylenically unsaturated monomer.

2. A product of claim 1 in which the epoxide containing addition-type polymer is a copolymer of a polymerizable ethylenically unsaturated epoxide-containing monomer and at least one other polymerizable ethylenically unsaturated monomer.

3. A product of claim 1 in which the epoxide-containing addition-type polymer is a copolymer of styrene and glycidyl methacrylate.

4. A product of claim 1 in which the epoxide-containing addition-type polymer is a copolymer of styrene and allyl glycidyl ether.

5. A product of claim 1 in which the epoxide-containing addition-type polymer is a copolymer of methyl methacrylate and glycidyl methacrylate.

6. A product of claim 1 in which the phosphated epoxide polymer is the reaction product of an epoxide-containing addition-type polymer and 0.25–1.50 mols of $H_3PO_4$ per mol of epoxide oxygen in said epoxide-containing polymer.

7. A product of claim 1 in which the phosphated epoxide polymer is the reaction product of an epoxide-containing addition-type polymer and 0.50–1.0 mol of $H_3PO_4$ per mol of epoxide oxygen in said epoxide-containing polymer.

8. A product of claim 1 in which the epoxide-containing compound free of phosphate groups is a monomeric epoxide.

9. A product of claim 1 in which the epoxide-containing compound free of phosphate groups is propylene oxide.

10. A product of claim 1 in which the epoxide-containing compound free of phosphate groups is a copolymer of a polymerizable ethylenically unsaturated epoxide-containing monomer and at least one other polymerizable ethylenically unsaturated monomer.

11. A product of claim 1 in which the epoxide-containing compound free of phosphate groups is a copolymer of styrene and glycidyl methacrylate.

12. A product of claim 1 in which the epoxide-containing compound free of phosphate groups is a copolymer of methyl methacrylate and glycidyl methacrylate.

13. A product of claim 1 in which the phosphated epoxide polymer and the epoxide-containing compound free of phosphate groups are present in such proportions that there are present 0.50–1.0 mol of epoxide oxygen in the epoxide-containing compound for each mol of phosphate ester, calculated as —$H_2PO_4$, in the phosphated epoxide polymer.

14. A product of claim 1 in which the epoxide-containing addition-type polymer is a copolymer of styrene and glycidyl methacrylate and the epoxide-containing compound free of phosphate groups is a copolymer of styrene and glycidyl methacrylate.

15. A product of claim 1 in which the epoxide-containing addition-type polymer is a copolymer of styrene and allyl glycidyl ether and the epoxide-containing compound free of phosphate groups is propylene oxide.

16. A product of claim 1 in which the epoxide-containing addition-type polymer is a copolymer of methyl methacrylate and glycidyl methacrylate and the epoxide-containing compound free of phosphate groups is a copolymer of methyl methacrylate and glycidyl methacrylate.

17. A liquid coating composition comprising a product of claim 1 and solvent.

18. A liquid coating composition comprising a product of claim 1, pigment and solvent.

19. An organic solvent-soluble thermosetting reaction product of a phosphated epoxide polymer and an epoxide-containing compound free of phosphate groups in such proportions that there are present 0.10–1.5 mols of epoxide oxygen in the epoxide-containing compound for each mol of phosphate ester, calculated as $H_2PO_4$, in the phosphated epoxide polymer, said phosphated epoxide polymer being a phosphate ester reaction product of a preformed epoxide-containing addition-type polymer prepared by polymerizing at least one polymerizable ethylenically unsaturated monomer.

20. A liquid coating composition comprising a product of claim 19 and solvent.

21. A liquid coating composition comprising a product of claim 19, pigment and solvent.

22. A thermoset reaction product of a phosphated epoxide polymer and an epoxide-containing compound free of phosphate groups in such proportions that there are present 0.10–1.5 mols of epoxide oxygen in the epoxide-containing compound for each mol of phosphate ester, calculated as $H_2PO_4$, in the phosphated epoxide polymer, said phosphated epoxide polymer being a phosphate ester reaction product of a preformed epoxide-containing addition-type polymer prepared by polymerizing at least one polymerizable ethylenically unsaturated monomer, said thermoset reaction product being insoluble in methyl ethyl ketone.

23. An article having an adherent coating comprising a thermoset reaction product of a phosphated epoxide polymer and an epoxide-containing compound free of phosphate groups in such proportions that there are present 0.10–1.5 mols of epoxide oxygen in the epoxide-containing compound for each mol of phosphate ester, calculated as $H_2PO_4$, in the phosphated epoxide polymer, said phosphated epoxide polymer being a phosphate ester reaction product of a preformed epoxide-containing addition-type polymer prepared by polymerizing at least one polymerizable ethylenically unsaturated monomer, said thermoset reaction product being insoluble in methyl ethyl ketone.

24. The process of preparing a thermosetting composition which comprises mixing a phosphated epoxide polymer and an epoxide-containing compound free of phosphate groups in such proportions that there are present 0.10–1.5 mols of epoxide oxygen in the epoxide-containing compound for each mol of phosphate ester, calculated as $H_2PO_4$, in the phosphated epoxide polymer, said phosphated epoxide polymer being a phosphate ester reaction product of a preformed epoxide-containing addition-type polymer prepared by polymerizing at least one polymerizable ethylenically unsaturated monomer.

References Cited in the file of this patent

UNITED STATES PATENTS

| | | |
|---|---|---|
| 2,528,932 | Wiles et al. | Nov. 7, 1950 |
| 2,541,027 | Bradley | Feb. 13, 1951 |
| 2,604,457 | Segall et al. | July 22, 1952 |
| 2,682,515 | Naps | June 29, 1954 |
| 2,692,876 | Cupery | Oct. 26, 1954 |